United States Patent
Tsuzuki

(10) Patent No.: US 9,462,194 B2
(45) Date of Patent: Oct. 4, 2016

(54) APPARATUS AND METHOD FOR CALCULATING FLICKER-EVALUATION VALUE

(71) Applicant: HANWHA TECHWIN CO., LTD., Changwon-Si (KR)

(72) Inventor: Takeru Tsuzuki, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 435 days.

(21) Appl. No.: 14/080,894

(22) Filed: Nov. 15, 2013

(65) Prior Publication Data

US 2014/0153839 A1  Jun. 5, 2014

(30) Foreign Application Priority Data

Dec. 4, 2012  (JP) ............................... 2012-0265770
Aug. 1, 2013  (KR) ........................ 10-2013-0091587

(51) Int. Cl.
 *G06T 7/00* (2006.01)
 *H04N 5/235* (2006.01)

(52) U.S. Cl.
 CPC .......... *H04N 5/2357* (2013.01); *H04N 5/2355* (2013.01)

(58) Field of Classification Search
 CPC ........... G06T 5/001; G06T 5/20; G06T 5/40; G06T 5/50; G06K 9/40
 See application file for complete search history.

(56) References Cited

U.S. PATENT DOCUMENTS

2011/0317028 A1  12/2011  Shinmei et al.

FOREIGN PATENT DOCUMENTS

| | | |
|---|---|---|
| JP | 2010-103746 A | 5/2010 |
| KR | 10-0867595 B1 | 11/2008 |

*Primary Examiner* — Duy M Dang
(74) *Attorney, Agent, or Firm* — Sughrue Mion, PLLC

(57) ABSTRACT

An apparatus and a method for calculating a flicker-evaluation value through a wide dynamic range (WDR) system. The apparatus includes: a first calculator configured to calculate a first difference between a pixel value of a long exposure image of a current frame and a pixel value of a long exposure image of a previous frame; an average calculator configured to calculate an average of the pixel value of the long exposure image of the current frame and the pixel value of the long exposure image of the previous frame; a second calculator configured to calculate a second difference between a pixel value of a short exposure image of the current frame and the average calculated by the average calculator; and a flicker-evaluation value calculator configured to calculate a flicker-evaluation value which indicates a flicker strength using the first difference and the second difference.

12 Claims, 10 Drawing Sheets

SHORT EXPOSURE IMAGE

LONG EXPOSURE IMAGE

WDR SYNTHETIC IMAGE

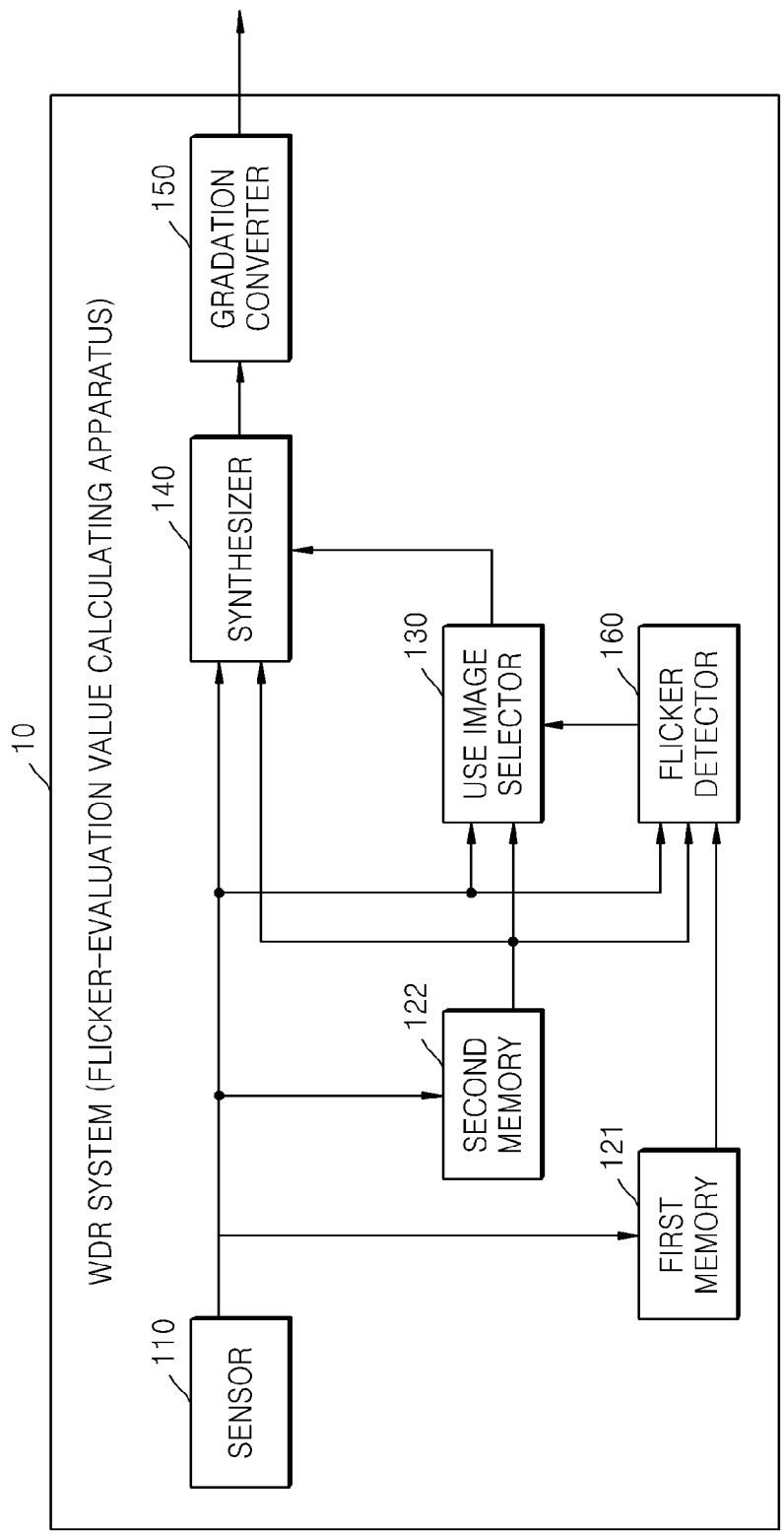

FLICKER DETECTION RESULT

WDR SYNTHETIC IMAGE

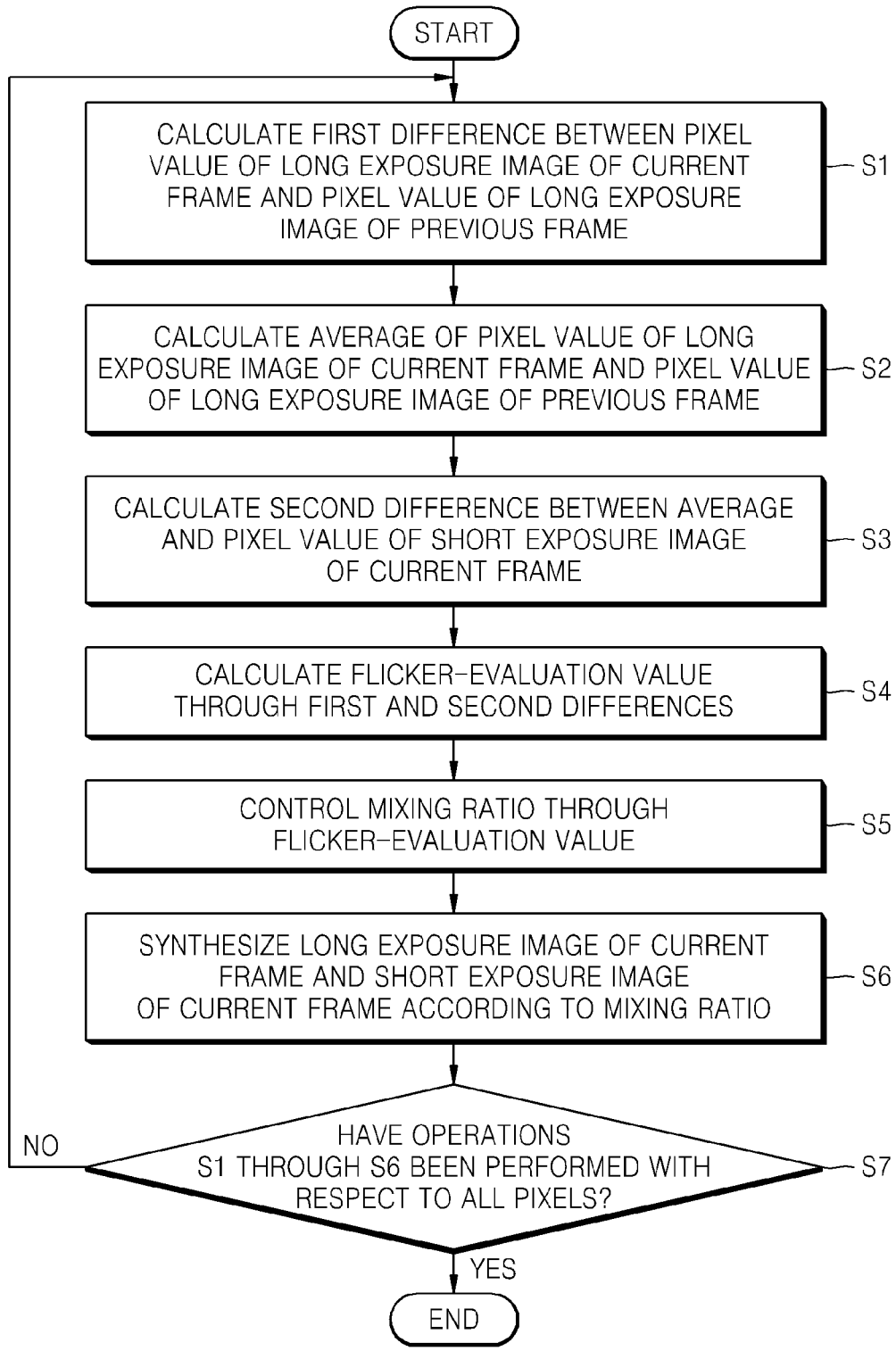

APPARATUS AND METHOD FOR CALCULATING FLICKER-EVALUATION VALUE

CROSS-REFERENCE TO RELATED APPLICATIONS

This application claims priority from Japanese Patent Application No. 2012-0265770, filed on Dec. 4, 2012, in the Japanese Patent Office and Korean Patent Application No. 10-2013-0091587, filed on Aug. 1, 2013, in the Korean Intellectual Property Office, the disclosures of which are incorporated herein in their entirety by reference.

BACKGROUND

1. Field

One or more exemplary embodiments relate to an apparatus and a method for calculating a flicker-evaluation value. In particular, exemplary embodiments relate to an apparatus and a method for a flicker-evaluation value which is effective for wide dynamic range (WDR) processing for synthesizing a long exposure image and a short exposure image.

2. Description of the Related Art

A photographing function of the related art, such as a wide dynamic range (WDR) or a high dynamic range (HDR), has been used to continuously capture and synthesize a short-time exposure image (hereinafter, referred to as a short exposure image) and a long-time exposure image (hereinafter, referred to as a long exposure image) in order to acquire an image that captures a dynamic range exceeding a dynamic range which may be captured by a sensor. The photographing function is particularly effective in a condition where contrast, such as a composition of backlight, etc., is very great.

However, two types of problems occur in a structure of the related art which synthesizes the short exposure image and the long exposure image. In the first problem, if a subject moves, an image is distorted when synthesizing images. Thus, a contour is doubled. In the second problem, flicker occurs in the short exposure image. If the short exposure image is used for synthesis, a synthetic image, including flicker, is output. Thus, the synthetic image becomes an image which is difficult to be seen.

A fluorescent lamp having no inverter may cause flicker. Among light-emitting diode (LED) products, there is an LED lamp having a low glimmering frequency. The glimmering of the LED lamp at such a low frequency may be a factor causing flicker. Backlight of a TV system, including a liquid crystal display (LCD) or a PC display, has increasing glimmer so as to improve a moving picture display performance. Glimmering by backlight of a TV system, including a liquid crystal display (LCD) or a PC display, is increased to improve the performance of displaying a moving picture. However, glimmering of the backlight may cause flicker.

A related art technique for reducing flicker of a WDR may be used. For example, there is a related art technique that captures flicker detecting orders of several frames, and determines whether flicker has occurred or determines a frequency according to the capturing result (e.g., see Japanese Patent Publication No. 2012-129972). According to the related art technique, international organization for standardization (ISO) sensitivity or an exposure value (EV) is controlled, or a shutter speed is set to be less affected by flicker, to perform capturing according to the determination result.

There is a related art technique that compares images which are respectively captured at shutter times of $\frac{1}{240}$ seconds and $\frac{1}{60}$ seconds to detect flicker (e.g., see Japanese Patent Publication No. 2012-119761). In the related art technique, priorities are set with respect to several WDR synthetic images and a gradation correction image of a short exposure image according to the flicker detection result. Further, displaying or recording of the several WDR synthetic images and the gradation correction image of the short exposure image is controlled according to the corresponding priorities.

Further, there is a related art technique which adjusts a difference between white balance (WB) occurring when synthesizing images captured in a flash environment and a WB occurring when synthesizing images captured in a no flash environment (e.g., see Japanese Patent Publication No. 2011-35894). According to the related art technique, average summation is performed on several images to reduce flicker. Also, the average summation is performed on the several images to acquire a WDR effect.

However, Japanese Patent Publication No. 2012-129972 discloses a related art technique which determines whether flicker has occurred or determines a frequency before performing capturing. Therefore, several frames are required for the determination. Thus, the related art technique may not cope with a situation where a flicker light source starts or ends lighting when capturing a moving picture. If a flicker light source having a high luminance is used, information about the high luminance may not be sufficiently acquired.

According to a related art technique disclosed in Japanese Patent Publication No. 2012-119761, if flicker is detected, a priority of a WDR synthetic image is lowered. If the priority of the WDR synthetic image is lowered, e.g., although flicker occurs in a part of a screen, a WDR effect in the whole part of the screen is acquired.

In a related art technique disclosed in Japanese Patent Publication No. 2011-35894, capturing and summation are repeatedly performed until flickers disappear, in order to reduce flickers through average summation performed on several captured images. Also, a plurality of frames are added to acquire a WDR effect, and an effect of extending a range is low.

SUMMARY

One or more exemplary embodiments include a technique which calculates a flicker-evaluation value for dynamically determining whether flicker has occurred in each pixel when performing wide dynamic range (WDR) processing for synthesizing a long exposure image and a short exposure image.

One or more exemplary embodiments include a technique which selects a long exposure image to avoid a flicker if the flicker is detected.

One or more exemplary embodiments include a technique which accurately detects a flicker area to acquire a moving picture which has no flicker and is WDR-processed.

Additional aspects will be set forth in part in the description which follows and, in part, will be apparent from the description, or may be learned by practice of the presented embodiments.

According to an aspect of the exemplary embodiments, an apparatus for calculating a flicker-evaluation value, includes: a first calculator configured to calculate a first difference between a pixel value of a long exposure image of a current frame and a pixel value of a long exposure image of a previous frame; an average calculator configured to calculate an average of the pixel value of the long exposure image of the current frame and the pixel value of the long exposure image of the previous frame; a second calculator configured to calculate a second difference between a pixel value of a short exposure image of the current frame and the average calculated by the average calculator; and a flicker-evaluation value calculator configured to calculate a flicker-evaluation value which indicates a flicker strength through the first difference and the second difference.

According to the above-described structure, a flicker-evaluation value may be calculated to dynamically determine whether flicker has occurred in each pixel. If the flicker is detected, a long exposure image may be selected to avoid the flicker. Also, a flicker area may be accurately detected to acquire a moving picture that has no flicker and has been WDR-processed.

The apparatus may further include a mixing ratio controller configured to control a mixing ratio of the long exposure image of the current frame to the short exposure image of the current frame using the flicker-evaluation value.

If the flicker-evaluation value is lower than a first threshold value, the mixing ratio controller may determine that a pixel to be evaluated is not flicker and set the mixing ratio of the long exposure image to the short exposure image of the corresponding pixel to 0. If the flicker-evaluation value is higher than a second threshold value, the mixing ratio controller may determine that the pixel to be evaluated is the flicker and limit the mixing ratio of the long exposure image to the short exposure image of the corresponding pixel to a constant value.

The flicker-evaluation value calculator calculates the flicker-evaluation value to be inversely proportional to the first difference. The flicker-evaluation value indicates a flicker strength. The low first difference indicates that a pixel value of the long exposure image is stabilized. This is one of the flicker characteristics.

the flicker-evaluation value calculator calculates the flicker-evaluation value to be proportional to the second difference. The great second difference indicates that the long exposure image is different from the short exposure image. This is one of the flicker characteristics.

The mixing ratio controller controls the mixing ratio of the long exposure image of the current frame to the short exposure image of the current frame to be proportional to the flicker-evaluation value. As the flicker-evaluation value indicating the strength of the flicker is great, the mixing ratio of the long exposure image of the current frame to the short exposure image is increased. Therefore, a possibility that a WDR synthetic image may include flicker may be lowered.

According to an aspect of the exemplary embodiments, a method of calculating a flicker-evaluation value, includes: calculating a first difference between a pixel value of a long exposure image of a current frame and a long exposure image of a previous frame; calculating an average of the pixel value of the long exposure image of the current frame and the pixel value of the long exposure image of the previous frame; calculating a second difference between a pixel value of a short exposure image of the current frame and the calculated average; and calculating a flicker-evaluation value which indicates a flicker strength through the first difference and the second difference.

The method may further include controlling a mixing ratio of the long exposure image of the current frame to the short exposure image of the current frame using the flicker-evaluation value.

The method may further include synthesizing the long exposure image of the current frame and the short exposure image of the current frame according to the mixing ratio controlled by the mixing ratio controller.

The method may further include calculating the flicker-evaluation value to be inversely proportional to the first difference.

The method may further include calculating the flicker-evaluation value to be proportional to the second difference.

The method may further include controlling the mixing ratio of the long exposure image of the current frame to the short exposure image of the current frame to be proportional to the flicker-evaluation value.

According to the method, a flicker-evaluation value may be calculated to dynamically determine whether flicker has occurred in each pixel. If the flicker is detected, the long exposure image may be selected to avoid the flicker. A flicker area may be accurately detected to acquire a moving picture that has no flicker and has been WDR-processed.

According to the exemplary embodiments, there is a provided a technique which when performing WDR processing, synthesizes a long exposure image and a short exposure image, and calculates a flicker-evaluation value for dynamically determining whether flicker has occurred in each pixel.

Therefore, if a flicker is detected, the long exposure image may be selected to avoid the flicker. A flicker area may be accurately detected to acquire a moving picture which has no flicker and has been WDR-processed.

BRIEF DESCRIPTION OF THE DRAWINGS

These and/or other aspects will become apparent and more readily appreciated from the following description of the exemplary embodiments, taken in conjunction with the accompanying drawings in which:

FIG. 3 is a block diagram illustrating a functional structure of a WDR system according to an embodiment;

FIG. 9 is a flowchart of an operation of the WDR system, according to an embodiment.

DETAILED DESCRIPTION OF EXEMPLARY EMBODIMENTS

Figure 1:
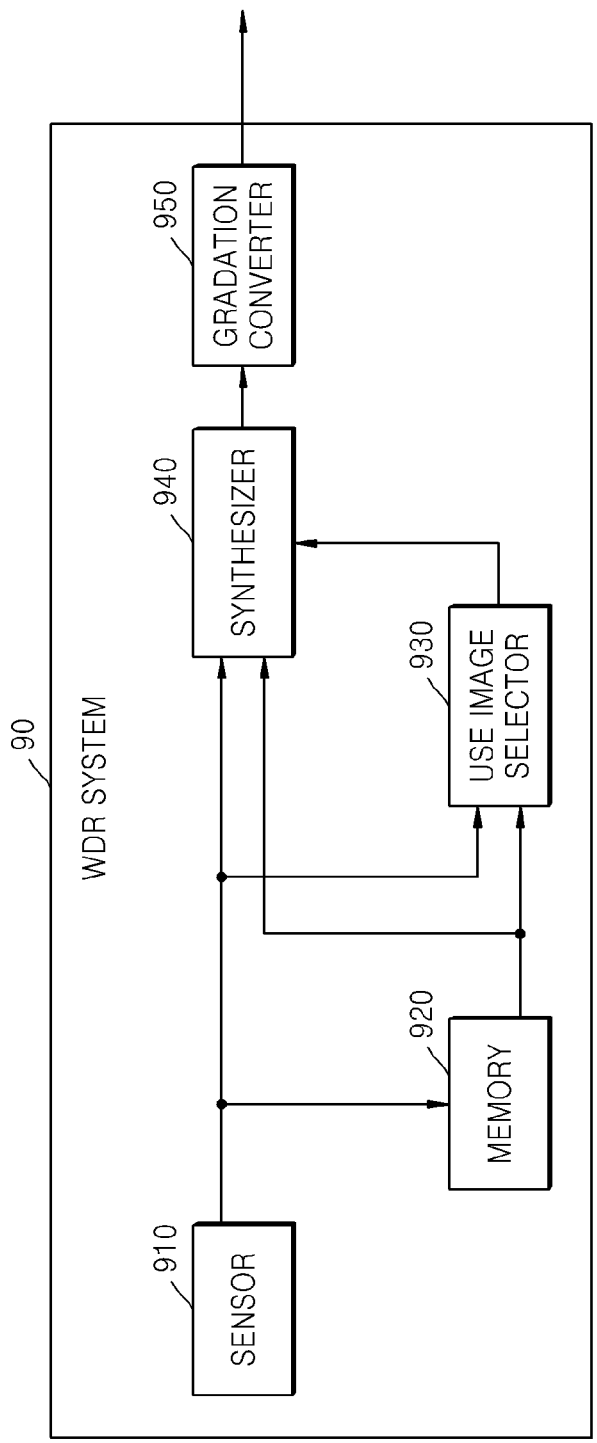
FIG. 1 is a block diagram illustrating a functional structure of a related art wide dynamic range (WDR) system.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

A related art wide dynamic range (WDR) system 90 will now be described. FIG. 1 is a block diagram illustrating a functional structure of the related art WDR system 90. The related art WDR system 90 changes exposure settings of a sensor 910 to continuously capture two images. The related art WDR system 90 performs short exposure capturing and then long exposure capturing. A short exposure image acquired through short exposure capturing is stored in a memory 920. If the short exposure capturing has ended, the related art WDR system 90 changes the exposure settings to perform the long exposure capturing.

In embodiments, the terminology "short exposure image" and "long exposure image" do not limit absolute exposure times of two captured images. Therefore, if two images having different exposure times are captured, one of the two captured images corresponds to a short exposure image having a relatively short exposure time, and the other one of the two images corresponds to a long exposure image having a relatively long exposure time.

A use image selector 930 detects saturation states, motions, etc., of the long exposure image and the short exposure image with reference to a long exposure image detected by the sensor 910 and a short exposure image read from the memory 920, and generates selection information for selecting one of the short exposure image and the long exposure image as a use image. Several algorithms are introduced as an algorithm for selecting one of a short exposure image and a long exposure image.

For example, an area saturated in the long exposure image may not be saturated in the short exposure image. Thus, the short exposure image is selected as a use image of the corresponding area. However, if only this process is performed, a contour may be doubled in an area where motion is great. Therefore, motion may be detected to reduce a phenomenon in which a contour is doubled. The algorithm for selecting one of the short exposure image and the long exposure image, including the above-described processing, is not particularly limited.

A synthesizer 940 receives the selection information from the use image selector 930 and synthesizes the short exposure image and the long exposure image through the selection information to generate a WDR image. A gradation converter 950 performs compression for converging a bit range of an image signal having a WDR into a predetermined bit range and gradation correction for approaching a scene seen with eyes, with respect to the WDR image generated by the synthesizer 940. The compression and the gradation correction may be performed simultaneously or at different timings.

Figure 2A:
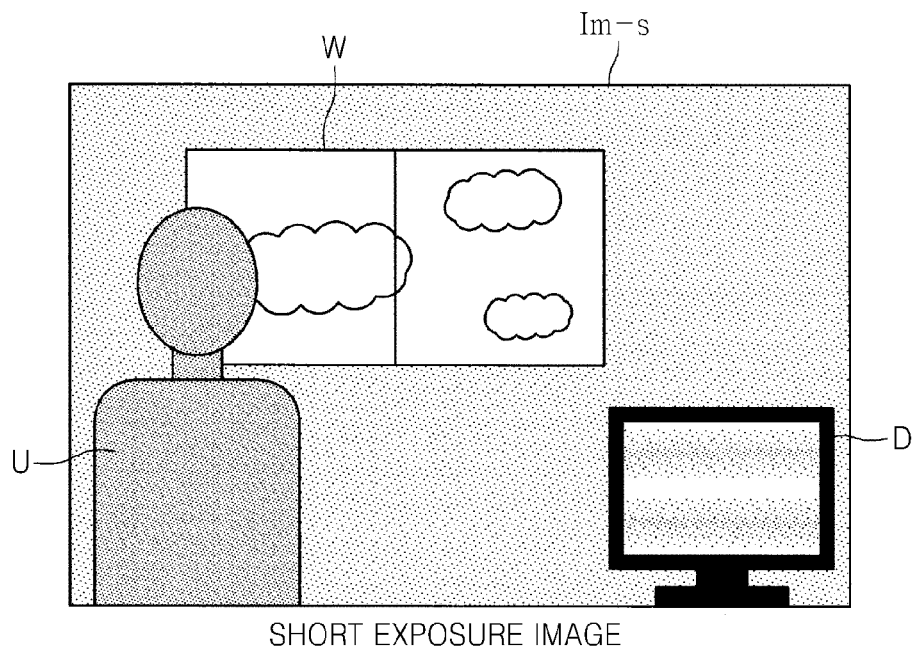
FIG. 2A is a view illustrating a short exposure image according to an embodiment.
Figure 2B:
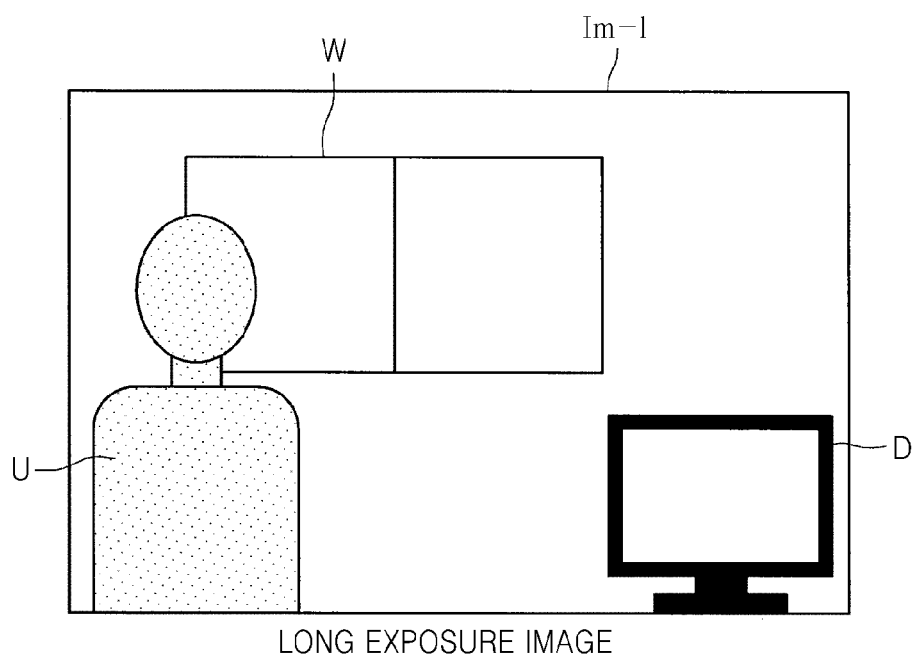
FIG. 2B is a view illustrating a long exposure image according to an embodiment.
Figure 2C:
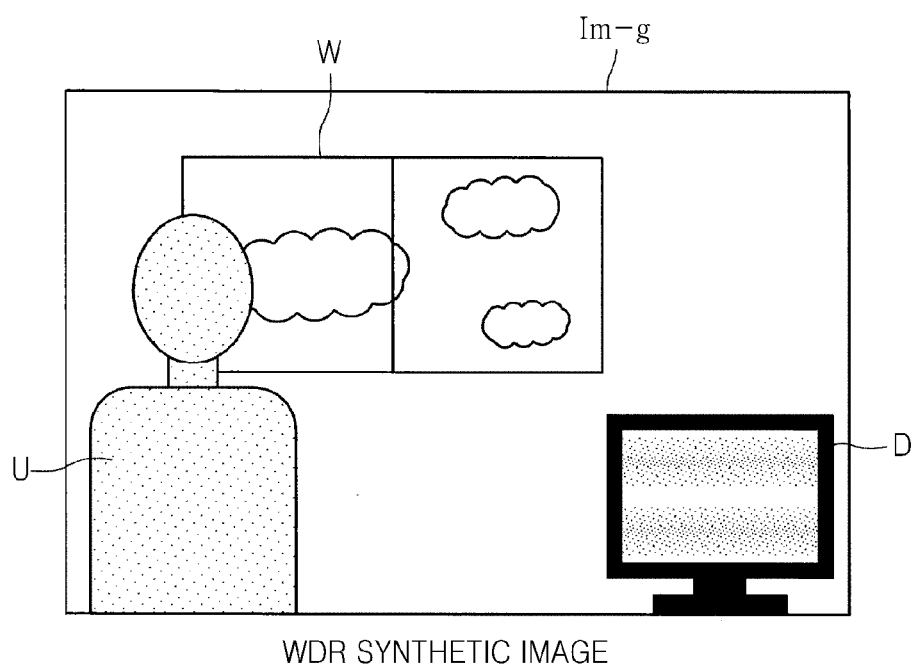
FIG. 2C is a view illustrating a WDR synthetic image acquired by a general WDR system.

FIG. 2A illustrates a short exposure image according to an embodiment. FIG. 2B illustrates a long exposure image according to an embodiment. FIG. 2C illustrates a WDR synthetic image acquired by the general WDR system 90.

Compositions shown in FIGS. 2A, 2B, and 2C are compositions of a backlight where a user U stands inside in front of a window W in the clear daytime, and a display D is glimmering under the right side of the window W. In a short exposure image Im-s of FIG. 2A, clouds outside the window W are clearly seen, but the user U or the inside darkens. Also, since a shutter time is short, a vertical striped flicker appears in the display D.

In a long exposure image Im-l of FIG. 2B, the user U or the inside is appropriately bright, and a shutter time is long. Therefore, there is no flicker in the display D, but a scene outside the window W is too bright. Thus, the scene outside the window W is saturated, and the clouds are not seen. If the short and long exposure images Im-s and Im-l are WDR-synthesized, a WDR synthetic image IM-g shown in FIG. 2C is acquired. Therefore, the short exposure image Im-s is used as an area in which the long exposure image Im-l is saturated. Thus, the clouds outside the window W are seen.

However, if an area where flicker exists is detected as a motion area according to an algorithm, the short exposure image Im-s is selected as a use image of the corresponding area by the use image selector 930. Therefore, the display D included in the short exposure image Im-s is synthesized by the synthesizer 940. Thus, the flicker in the display D is seen.

A functional structure of a WDR system 10 according to an embodiment will now be described. FIG. 3 is a block diagram illustrating the functional structure of the WDR system 10 according to an embodiment. As shown in FIG. 3, the WDR system 10 includes a sensor 110, a first memory 121, a second memory 122, a use image selector 130, a synthesizer 140, a gradation converter 150, and a flicker detector 160.

Functions of functional blocks of the WDR system 10 will now be described in detail. The WDR system 10 is an apparatus that calculates a flicker-evaluation value according to an embodiment.

The sensor 110 is an image sensor which forms incident light from the outside as an image on a light-receiving surface of an imaging device, photoelectrically converts the light formed as the image into a charge amount, and converts the charge amount into an electrical signal. A type of the image sensor is not particularly limited, e.g., may be a charge-coupled device (CCD) or a complementary metal oxide semiconductor (CMOS) image sensor.

The sensor 110 changes exposure settings to alternately and continuously capture a long exposure image and a short exposure image. A long exposure image of a previous frame captured through a long exposure is stored in the first memory 121. A short exposure image of a current frame captured through a short exposure is stored in the second memory 122. If the capturing of the short exposure image of the current frame has ended, the WDR system 10 changes the exposure settings to perform long exposure capturing in order to acquire a long exposure image of the current frame. The previous frame refers to a frame 1 frame before the current frame.

The flicker detector 160 detects flicker in each pixel using the long exposure image of the previous frame output from the first memory 121 and, the short exposure image of the current frame output from the second memory 122. The flicker detection result of the flicker detector 160 is used by the use image selector 130.

Figure 4:
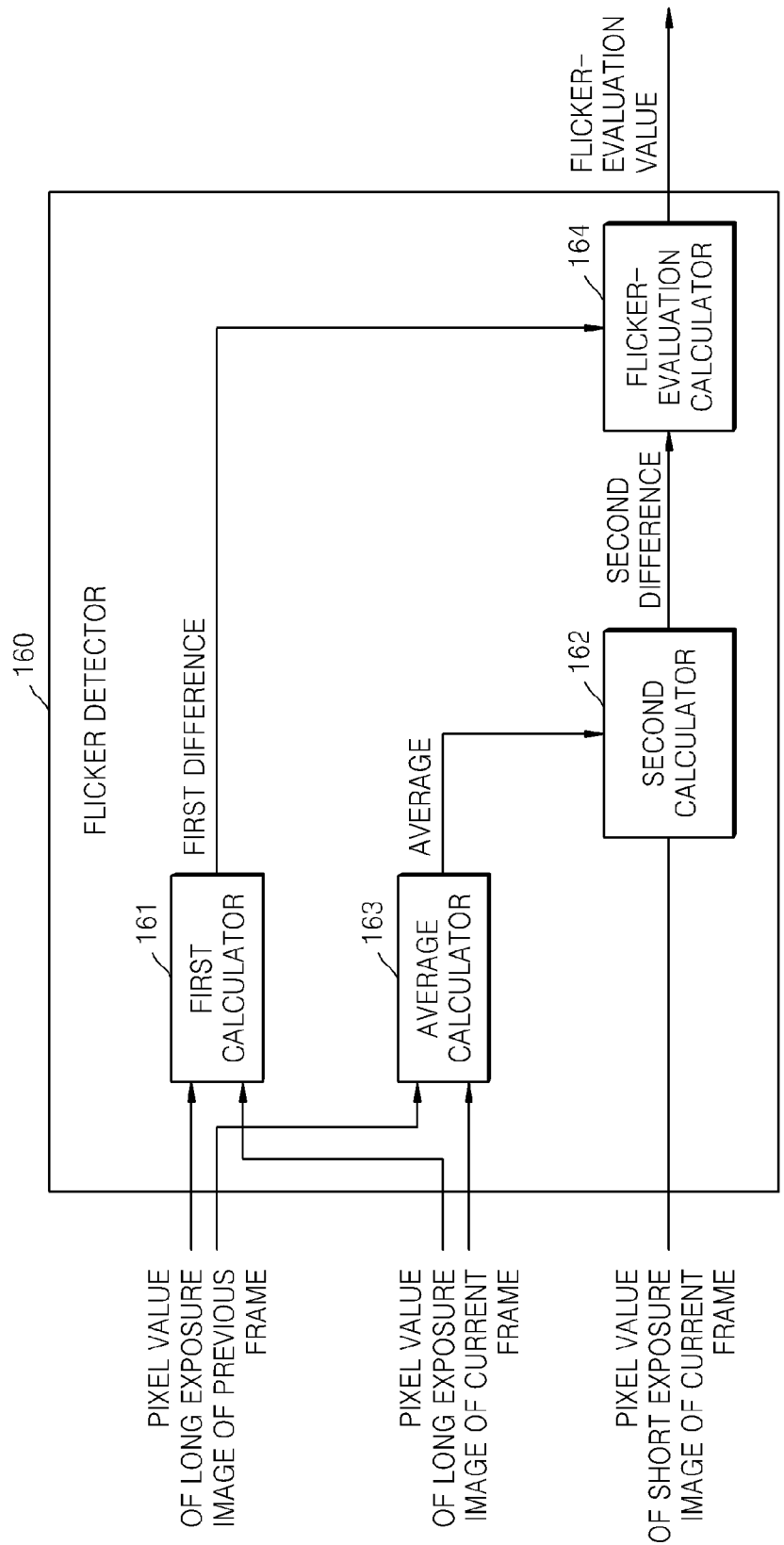
FIG. 4 is a block diagram illustrating a detailed functional structure of a flicker detector according to an embodiment.
Figure 5:
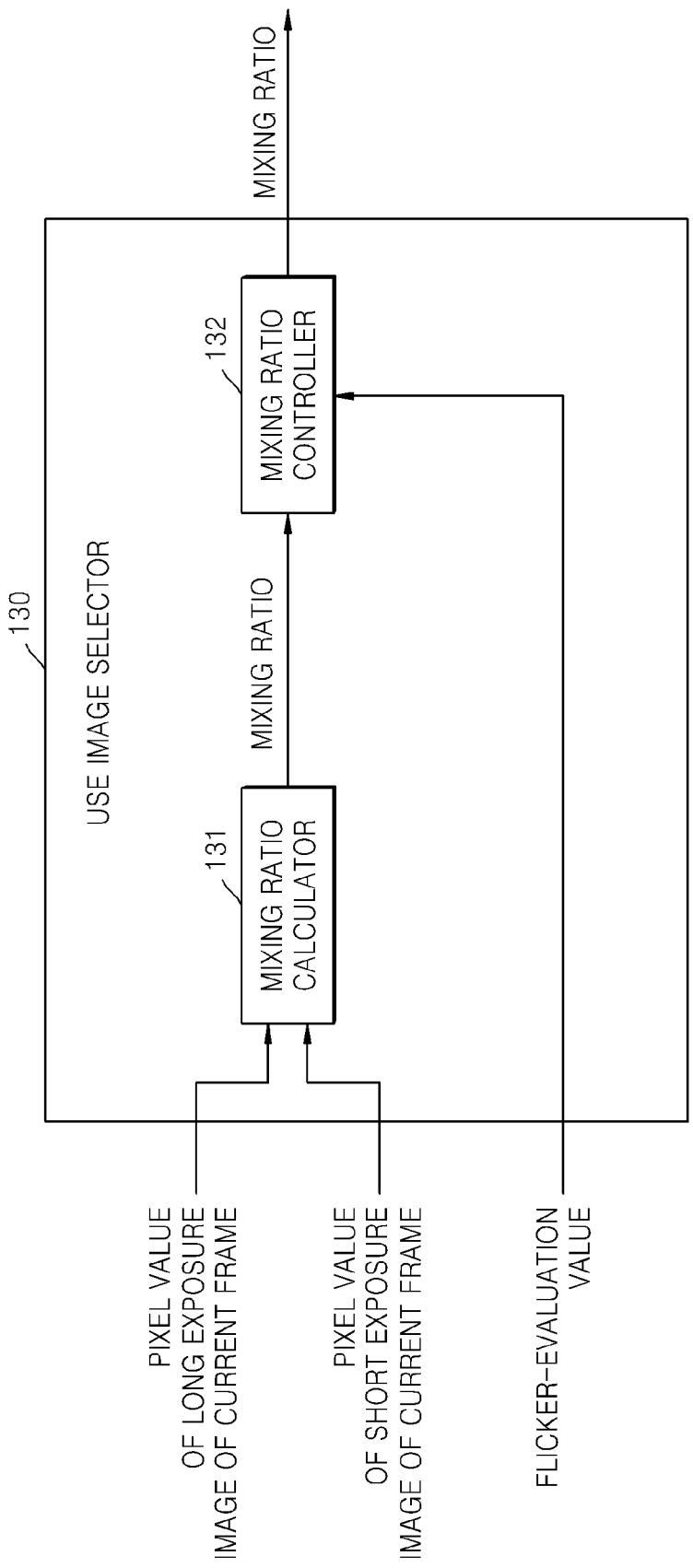
FIG. 5 is a block diagram illustrating a detailed functional structure of a use image selector according to an embodiment.

FIG. 4 is a block diagram illustrating a detailed functional structure of the flicker detector 160 according to an embodiment. FIG. 5 is a block diagram illustrating a detailed functional structure of the use image selector 130 according to an embodiment. The spirit and scope of the exemplary embodiments involves a flicker detection according to an embodiment. As a precondition of an embodiment, a long exposure image of two images, including the long exposure image and a short exposure image, hardly includes flickers and is constantly stable.

A shutter time of a long exposure image may be set to 1/60 seconds (or 1/50 seconds) to create a situation where the long exposure image hardly includes flickers. A capturing condition of a short exposure image is freely determined by a specification of a dynamic range extending performance and set within a range between 1 of several and 1 of several tens of a shutter time of long exposure capturing.

Differences between a still area, a motion area, and a flicker area will be described under this precondition.

Figure 6A:
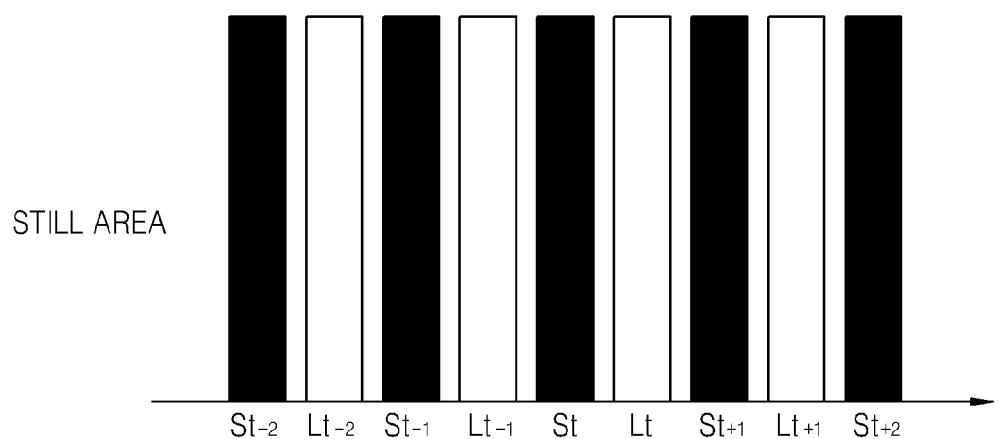
FIG. 6A is a graph illustrating time changes of a pixel value of a still area.
Figure 6B:
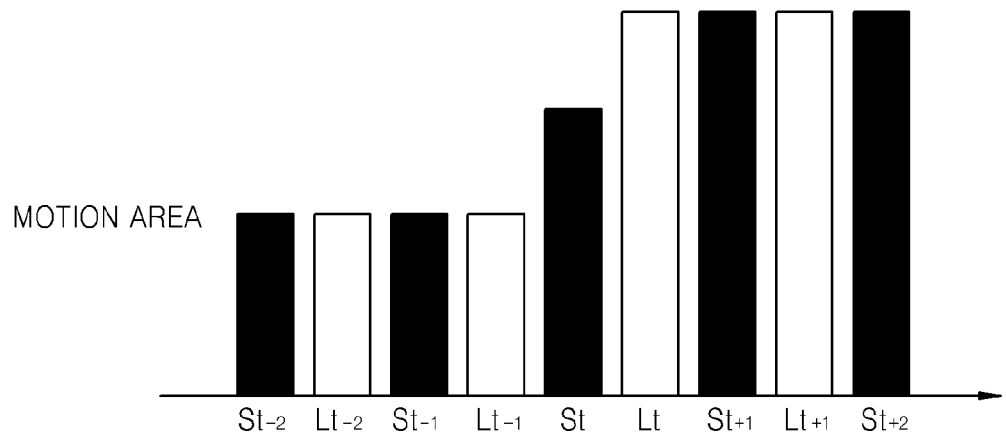
FIG. 6B is a graph illustrating time changes of a pixel value of a motion area.
Figure 6C:
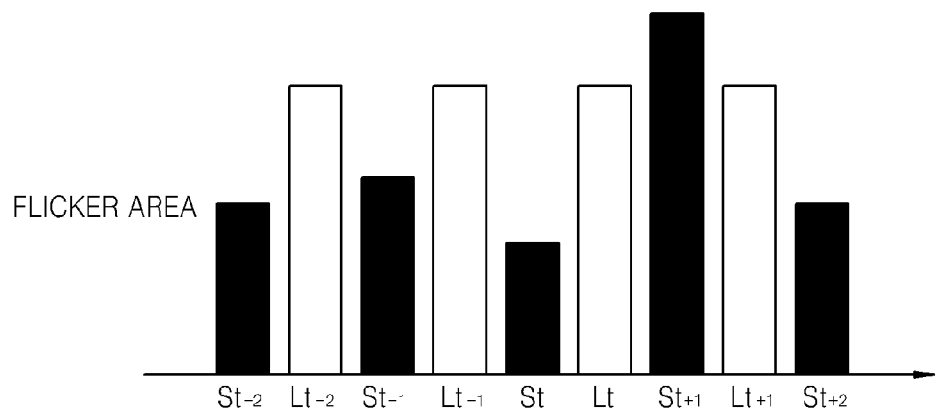
FIG. 6C is a graph illustrating time changes of a pixel value of a flicker area.

FIG. 6A is a graph illustrating time changes of a pixel value of a still area according to an embodiment. FIG. 6B is a graph illustrating time changes of a pixel value of a motion area according to an embodiment. FIG. 6C is a graph illustrating time changes of a pixel value of a flicker area according to an embodiment.

In FIGS. 6A, 6B, and 6C, S denotes a value corresponding to a pixel value of a short exposure image, and L denotes a pixel value of a long exposure image. Also, the value corresponding to the pixel value of the short exposure image may be a result acquired by multiplying the pixel value of the short exposure image by a ratio of an exposure time of the long exposure image to the short exposure image, and normalizing the multiplication result. For example, if the short exposure image is captured at an exposure time of 1/10 with respect to the long exposure image, the pixel value of the short exposure image is multiplied by 10 to calculate the value corresponding to the pixel value of the short exposure image.

As shown in FIG. 6A, if a capturing area is the still area, and an illumination environment is constant, pixel values of the long exposure image and the short exposure image hardly change. As shown in FIG. 6B, if the capturing area is the motion area and is changed from a dark texture into a bright texture, the pixel values of the short exposure image and the long exposure image are increased from normal states through transient states, and then return into normal states.

As shown in FIG. 6C, if the capturing area is the flicker area, the short exposure image includes flickers. Thus, the pixel value of the short exposure image is greatly changed. However, the long exposure image hardly includes flickers. Thus, the pixel value of the long exposure image is hardly changed. The short exposure image may be captured when fading in or fading out the glimmering of a flicker light source. However, the long exposure image is averaged to capture luminance thereof.

Therefore, the pixel value of the short exposure image may be greater or smaller than the pixel value of the long exposure image. Referring to FIGS. 6B and 6C, the capturing area is not determined as the motion area or the flicker area only through a comparison between the pixel values of a pair of a long exposure image and a short exposure image. A long exposure image of a previous frame may be added to compare three pixel values in order to accurately determine a flicker. A flicker-evaluation value is acquired by Equation 1 below in consideration of a characteristic of a flicker:

$$Vfe = (C - |Lt_{-1} - Lt|)s \left| \frac{(Lt_{-1} + Lt)}{2} - St \right| \quad (1)$$

Vfe denotes a flicker-evaluation value, C denotes a constant, $Lt_{-1}$ denotes the pixel value of the long exposure image of the previous frame, St denotes the pixel value of the short exposure image of the current frame, Lt denotes the pixel value of the long exposure image of the current frame, s denotes a multiplication sign, and a first term denotes stability of the long exposure image.

A first calculator 161 calculates a difference (a first difference) between the pixel value $Lt_{-1}$ of the long exposure image of the previous frame and the pixel value Lt of the long exposure image of the current frame. As the difference is small, the pixel value of the long exposure image is stable.

A result (the first term of Equation 1 above) of subtracting the first difference from the constant C may be acquired to indicate that as the pixel value of the long exposure image is stable, the flicker-evaluation Vfe increases. If the first term of Equation 1 above has a negative value, a value of the first term may be replaced with 0 by the first calculator 161.

A second term of Equation 1 above denotes a difference between the short exposure image and the long exposure image.

An average calculator 163 calculates an average of the pixel value $Lt_{-1}$ of the long exposure image of the previous frame and the pixel value Lt of the long exposure image of the current frame.

A second calculator 162 calculates a difference (a second difference) between the average and the pixel value St of the short exposure image of the current frame. As the difference is great, the difference indicates that the short exposure image is different from the long exposure image. The pixel value St of the short exposure image of the current frame has been described above in detail.

A flicker-evaluation value calculator 164 calculates the flicker-evaluation value Vfe according to the first difference calculated by the first calculator 161 and the second difference calculated by the second calculator 162. The flicker-evaluation value Vfe denotes the strength of flicker.

As described above, as the first difference calculated by the first calculator 161 is small, the pixel value of the long exposure image is stable. Therefore, the flicker-evaluation value calculator 164 calculates the flicker-evaluation value Vfe to be inversely proportional to the first difference.

As the difference calculated by the second calculator 162 is great, the difference indicates that the short exposure image is different from the long exposure image. Therefore, the flicker-evaluation value calculator 164 calculates the flicker-evaluation value Vfe to be proportional to the second difference.

The flicker-evaluation value Vfe is calculated by a flicker-evaluation function such as Equation 1 above. According to the flicker-evaluation value Vfe of Equation 1 above, as a result of multiplying the second term, if conditions "long exposure image is stabilized" and "short exposure image is different from long exposure image" are satisfied, a pixel to be evaluated may be evaluated as flicker.

As the flicker-evaluation value is great, a probability that a pixel to be evaluated may be a flicker is increased. Thus, the flicker-evaluation value indicates that the pixel is a strong flicker. As the flicker-evaluation value is small, a probability that the pixel to be evaluated may be a flicker is decreased. Thus, the flicker-evaluation value indicates that the pixel is a weak flicker.

A mixing ratio calculator 131 calculates a mixing ratio of the long exposure image to the short exposure image. For example, the mixing ratio calculator 131 calculates the mixing ratio of the long exposure image to the short exposure image through a saturation state, motion, etc., of a captured image. For example, as a saturation degree of the long exposure image is strong, the mixing ratio calculator 131 decreases the mixing ratio of the long exposure image to the short exposure image. As motion of the long exposure image or the short exposure image is great, the mixing ratio calculator 131 decreases the mixing ratio of the long exposure image to the short exposure image.

A mixing ratio controller 132 controls the mixing ratio of the long exposure image of the current frame to the short exposure image of the current frame through the flicker-evaluation value calculated by the flicker-evaluation calculator 164.

In the present embodiment, an object to be controlled by the mixing ratio controller 132 is the mixing ratio calculated by the mixing ratio calculator 131. However, the object may not be the mixing ratio.

Various methods of controlling a mixing ratio through the mixing ratio controller 132 may be used. For example, as the flicker-evaluation value calculated by the flicker-evaluation value calculator 164 is great, the mixing ratio controller 132 may control the mixing ratio of the long exposure image of the current frame to the short exposure image of the current frame to be increased.

Figure 7:
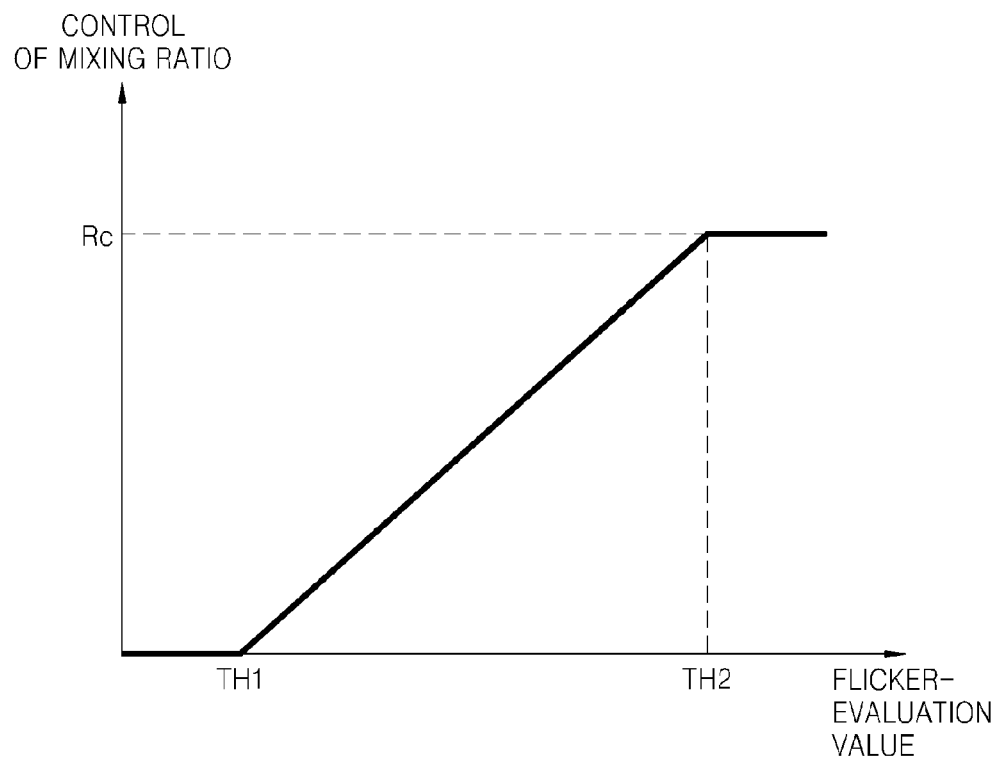
FIG. 7 is a graph illustrating a relation between a flicker-evaluation and a control of a mixing ratio.

FIG. 7 is a graph illustrating a relation between a flicker-evaluation value and a mixing ratio according to an embodiment. For example, the mixing ratio controller 132 may adjust a mixing ratio according to input/output characteristics as shown in FIG. 7.

As shown in FIG. 7, if a flicker-evaluation value is lower than a first threshold value TH1, the mixing ratio controller 132 may detect that a pixel to be evaluated is not a flicker to set a mixing ratio of a long exposure image to a short exposure image in a corresponding pixel to 0. If the flicker-evaluation value is higher than a second threshold value TH2 as shown in FIG. 7, the mixing ratio controller 132 may detect that the pixel to be evaluated is the flicker to limit the mixing ratio of the long exposure image to the short exposure image in the corresponding pixel to a constant value Rc. The constant value Rc may be 1 or another value.

A transient area exists between the first and second threshold values TH1 and TH2. As shown in FIG. 7, as the flicker-evaluation value calculated by the flicker-evaluation calculator 164 is great, the mixing ratio controller 132 controls the mixing ratio of the long exposure image of the current frame to the short exposure image of the current frame in a pixel corresponding to the transient area to be increased.

A flicker changes a temporal direction and/or a spatial direction of luminance, and the changes may be compared using a Y signal to detect the flicker. However, if one of R, G, and B components includes a strong flicker, the strength of the flicker weakens in the Y signal. Even in this case, the flicker-evaluation value calculator 164 may calculate the flicker-evaluation value of each of R, G, and B signals and detect a high-density flicker using the calculation result.

Further, if flicker-evaluation values are respectively calculated for the R, G, and B signals, the flicker-evaluation value calculator 164 uses the maximum flicker-evaluation value of the flicker-evaluation values of the R, G, and B signals. If the maximum flicker-evaluation value is used, a possibility of reducing flickers is increased.

The synthesizer 140 synthesizes the long exposure image of the current frame and the short exposure image of the current frame according to the mixing ratio controlled by the mixing ratio controller 132. For example, if the mixing ratio of the long exposure image to the short exposure image is a, the synthesizer 140 applies a synthetic pixel value Vcc of Equation 2 below to corresponding pixels in the long exposure image and the short exposure image of the current frame.

$$Vcc = \alpha sVcl + (1-\alpha)sVcs \quad (2)$$

Vcl denotes a pixel value of the long exposure image of the current frame, s denotes a multiplication sign, and Vcs denotes a pixel value of the short exposure image of the current frame. An image acquired by the synthetic pixel value Vcc of Equation 2 above is a WDR image.

A function of the gradation converter 150 is equal to a function of the gradation converter 950.

Figure 8A:
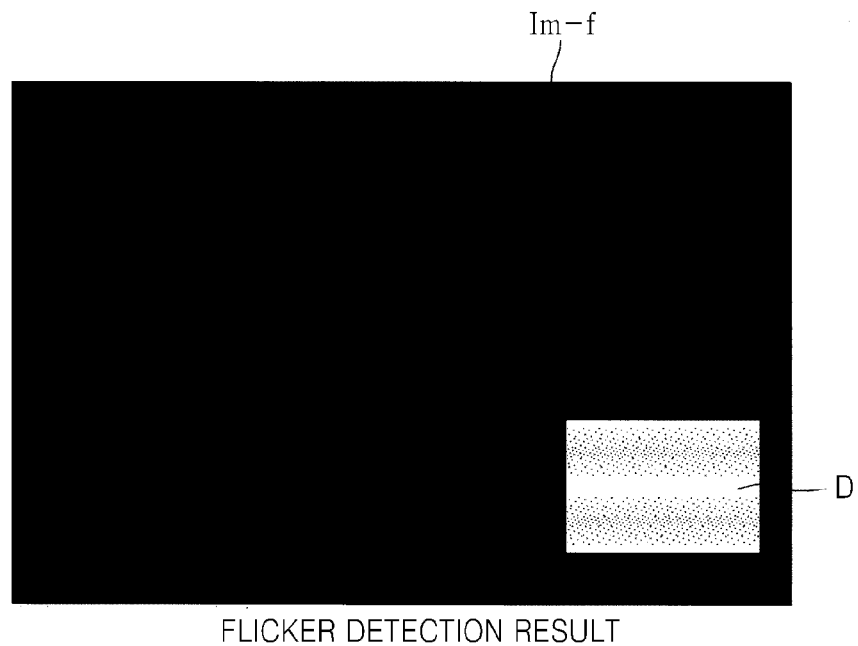
FIG. 8A is a view illustrating a result of detecting a flicker through a WDR system according to an embodiment.
Figure 8B:
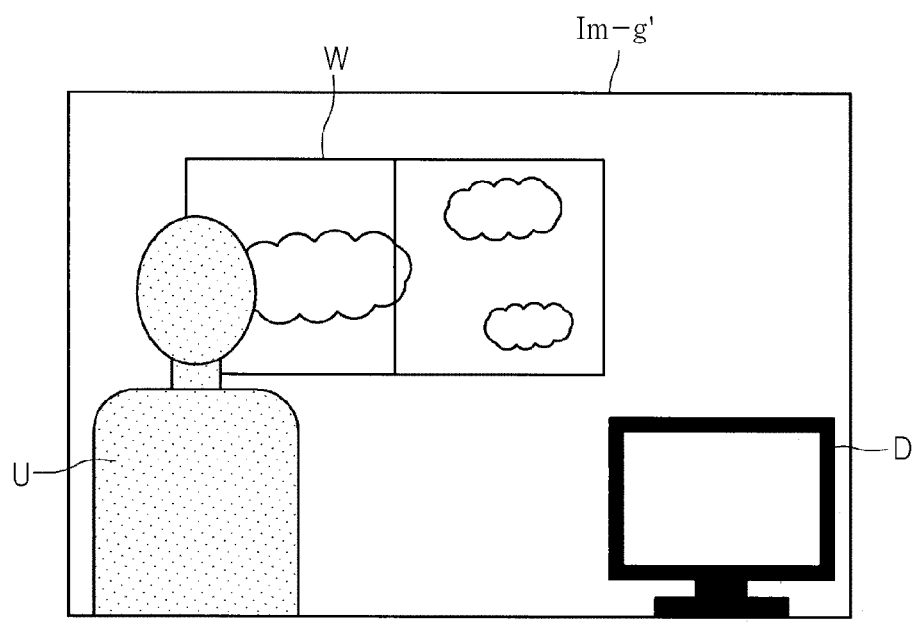
FIG. 8B is a WDR synthetic image acquired by the WDR system according to an embodiment.

FIG. 8A is a view illustrating a flicker detection result acquired by the WDR system 10, according to an embodiment. FIG. 8B is a WDR synthetic image acquired by the WDR system 10, according to an embodiment. As shown in FIG. 8A, a flicker detection result Im-f includes a group of pixels, which are determined as a flicker by the mixing ratio controller 132, as a display D. The WDR system 10 according to an embodiment may accurately detect a flicker area.

As shown in FIG. 8B, similar to the WDR synthetic image Im-g of FIG. 2C, in a WDR synthetic image Im-g', as to a window W, a short exposure image is output as a WDR image. Referring to the WDR synthetic image Im-g', as to the display D corresponding to the pixel group determined as the flicker, a long exposure image is output as a WDR synthetic image. As to another pixel group (for example, a user U or the like), a long exposure image is output as a WDR synthetic image. The WDR system 10 according to the present embodiment keeps a performance of the WDR processing without affecting an area except the display D to remove flicker appearing in the display D.

FIG. 9 is a flowchart of an operation of the WDR system 10, according to an embodiment.

As shown in FIG. 9, in operation S1, the first calculator 161 calculates a first difference between a pixel value of a long exposure image of a current frame and a pixel value of a long exposure image of a previous frame.

In operation S2, the average calculator 163 calculates an average of the pixel value of the long exposure image of the current frame and the pixel value of the long exposure image of the previous frame.

In operation S3, the second calculator 162 calculates a second difference between the average and a pixel value of a short exposure image of the current frame.

In operation S4, the flicker-evaluation value calculator 164 calculates a flicker-evaluation value through the first difference calculated by the first calculator 161 and the second difference calculated by the second calculator 162.

In operation S5, the mixing ratio controller 132 controls a mixing ratio through the flicker-evaluation value. In operation S6, the synthesizer 140 synthesizes the long exposure image of the current frame and the short exposure image of the current frame according to the mixing ratio controlled by the mixing ratio controller 132.

If there is a pixel that has not undergone operations S1 through S6 (No in operation S7), the process returns to operation S1 to repeat operations S1 through S6 with respect to the pixel. Otherwise, if operations S1 through S6 are ended with respect to all pixels (Yes in operation S7), operations S1 through S6 are ended.

According to embodiments, when performing WDR processing that synthesizes a long exposure image and a short exposure image, a flicker-evaluation value may be calculated to dynamically determine whether flicker has occurred in each pixel. If flicker is detected as described above, a long exposure image may be selected as a synthetic image to avoid synthesizing of images including flickers.

Also, if the flicker is detected, a long exposure image is selected as a synthetic image to avoid synthesizing of images including flickers. In addition, a flicker area may be accurately detected to acquire a moving picture which has no flicker and has been WDR-processed.

Effects showing according to the embodiments will now be described in more detail.

When performing WDR processing that alternately captures and synthesizes a short exposure image and a long exposure image, flicker may be accurately determined through a structure and an evaluation function of a flicker detection which uses a short exposure image including flicker and two long exposure images including no flicker.

In order to perform a flicker determination with respect to each pixel, although an area including flicker and an area including no flicker are mixed in a captured image, only a flicker area may be processed. Therefore, WDR synthetic processing may be continuously performed without removing a WDR effect on a whole screen.

A description of a situation where a flicker light source is faded in or faded out when capturing a moving picture follows.

A condition that the long exposure image does not include flicker is required. A shutter time of the long exposure image may be set to 1/60 seconds or 1/50 seconds or less. However, a short exposure image is not limited. Therefore, lowering of a performance of WDR may not occur when realizing a reduction in flicker.

A memory for storing a long exposure image 1 frame before is added to the flicker determination. Therefore, the memory may be a factor of increasing cost. However, the long exposure image 1 frame before is used only for the flicker determination. Thus, precision may be lowered. For example, if data output from a sensor is 12 bits, an amount of the data is lowered to 8 bits. Therefore, although the lower data amount is stored in the memory, this hardly affects the precision of the flicker determination. A flicker of only one pixel may not exist, and a flicker area usually has a predetermined area. Therefore, a resolution may be lowered to write the data in the memory, and the flicker determination may be performed through the low-resolution image. This may greatly reduce a size of the added memory.

Bayer data may be appropriately used as a signal that is to be processed by a technique according to an embodiment. However, the signal is not limited to the Bayer data. Thus, the signal may be RGB data or YUV data.

As an example of WDR capturing, a short exposure image is captured, and then a long exposure image is captured. However, capturing orders of the long exposure image and the short exposure image are not particularly limited. Therefore, the long exposure image may be captured, and then the short exposure image may be captured.

Also, the long exposure image is used in an area where flicker is detected. However, if the long exposure image is saturated, a WDR effect may not be acquired. Therefore, the short exposure image may be used in the area including the flicker. In this case, a condition for determining the flicker area may be weakened or may be removed, and the short exposure image may be used. These may be set by a user selection.

Comparison results between the techniques disclosed in the patent documents and the technique of the exemplary embodiments will now be described in more detail.

In the related art technique disclosed in Japanese Patent Publication No. 2012-129972, flicker detection is performed before performing capturing. Also, several frames are required for the flicker detection. Therefore, if the technique is applied to capturing of a moving picture, the technique may cope with a situation where a flicker light source starts or ends lighting when performing capturing. A shutter speed that is less affected by flicker may be set to 1/50 seconds or less or may synchronize with a frequency of a flicker source. However, although the shutter speed is set to 1/50 seconds or less, and ISO is lowered when capturing a short exposure image, about ISO 100 is generally an upper limit, and the short exposure image is shortly saturated. Therefore, a high luminance part is not sufficiently checked.

In comparison to the related art technique disclosed in Japanese Patent Publication No. 2012-129972, the technique of the exemplary embodiments may process an image in real time. Thus, the technique of the exemplary embodiments may be applied to a moving picture. In the exemplary embodiments, the capturing condition is not affected by flicker. Thus, a WDR performance is not lowered.

In the related art technique disclosed in Japanese Patent Publication No. 2012-119761, if a flicker or a great motion is detected from a captured image, priorities of several WDR synthetic images are lowered to use an image where a gradation correction has been performed on a short exposure image. Therefore, a WDR effect may not be acquired. Although a flicker is a part of a screen, a WDR effect may disappear from the whole screen.

In comparison to the related art technique disclosed in Japanese Patent Publication No. 2012-119761, according to the technique of the exemplary embodiments, if a flicker exists in a portion of a captured image and a flicker does not exist in another portion of the captured image, an output image is changed only in an area where flicker has been detected, and a WDR effect disappears from the other areas.

In the related art technique disclosed in Japanese Patent Publication No. 2011-35894, capturing may be repeated until flicker is detected. Also, a WDR effect is acquired through additions of a plurality of frames, and a dynamic range extending effect is low.

In comparison to the related art technique disclosed in Japanese Patent Publication No. 2011-35894, the technique of the exemplary embodiments have a great dynamic range extending effect, and does not require capturing of several images.

Therefore, if flicker is detected, a long exposure image may be selected to avoid the flicker. Also, a flicker area may be accurately detected to acquire a moving picture which has no flicker and has been WDR-processed.

While one or more embodiments have been described with reference to the figures, it will be understood by those of ordinary skill in the art that various changes in form and details may be made therein without departing from the spirit and scope of the exemplary embodiments as defined by the following claims.

What is claimed is:

1. An apparatus for calculating a flicker-evaluation value, the apparatus comprising:
    a first calculator configured to calculate a first difference between a pixel value of a long exposure image of a current frame and a pixel value of a long exposure image of a previous frame;
    an average calculator configured to calculate an average of the pixel value of the long exposure image of the current frame and the pixel value of the long exposure image of the previous frame;

a second calculator configured to calculate a second difference between a pixel value of a short exposure image of the current frame and the average calculated by the average calculator;

a flicker-evaluation value calculator configured to calculate a flicker-evaluation value which indicates a flicker strength using the first difference and the second difference; and a synthesizer configured to synthesize the long exposure image of the current frame and the short exposure image of the current frame based on the flicker-evaluation value.

2. The apparatus of claim 1, further comprising:

a mixing ratio controller configured to control a mixing ratio of the long exposure image of the current frame to the short exposure image of the current frame using the flicker-evaluation value.

3. The apparatus of claim 2, wherein the synthesizer is further configured to synthesize the long exposure image of the current frame and the short exposure image of the current frame according to the mixing ratio controlled by the mixing ratio controller.

4. The apparatus of claim 1, wherein the flicker-evaluation value calculator calculates the flicker-evaluation value to be inversely proportional to the first difference.

5. The apparatus of claim 1, wherein the flicker-evaluation value calculator calculates the flicker-evaluation value to be proportional to the second difference.

6. The apparatus of claim 2, wherein the mixing ratio controller controls the mixing ratio of the long exposure image of the current frame to the short exposure image of the current frame to be proportional to the flicker-evaluation value.

7. A method of calculating a flicker-evaluation value, the method comprising:

calculating a first difference between a pixel value of a long exposure image of a current frame and a long exposure image of a previous frame;

calculating an average of the pixel value of the long exposure image of the current frame and the pixel value of the long exposure image of the previous frame;

calculating a second difference between a pixel value of a short exposure image of the current frame and the calculated average;

calculating a flicker-evaluation value which indicates a flicker strength through the first difference and the second difference; and synthesizing the long exposure image of the current frame and the short exposure image of the current frame based on the flicker-evaluation value.

8. The method of claim 7, further comprising controlling a mixing ratio of the long exposure image of the current frame to the short exposure image of the current frame using the flicker-evaluation value.

9. The method of claim 8, wherein the synthesizing comprises synthesizing the long exposure image of the current frame and the short exposure image of the current frame according to the mixing ratio controlled.

10. The method of claim 7, wherein the flicker-evaluation value is calculated to be inversely proportional to the first difference.

11. The method of claim 7, wherein the flicker-evaluation value is calculated to be proportional to the second difference.

12. The method of claim 8, wherein the mixing ratio of the long exposure image of the current frame to the short exposure image of the current frame is controlled to be proportional to the flicker-evaluation value.

* * * * *